United States Patent [19]

Kobayashi et al.

[11] Patent Number: 4,806,963
[45] Date of Patent: Feb. 21, 1989

[54] APERTURE DECISION SYSTEM FOR FLASH PHOTOGRAPHING

[75] Inventors: Ryuichi Kobayashi; Yoshihito Harada; Masaharu Kawamura, all of Kanagawa; Hiroyuki Kataoka, Tokyo; Toshiyuki Kumakura, Kanagawa, all of Japan

[73] Assignee: Canon Kabushiki Kaisha, Tokyo, Japan

[21] Appl. No.: 171,142

[22] Filed: Mar. 16, 1988

Related U.S. Application Data

[63] Continuation of Ser. No. 944,878, Dec. 22, 1986, abandoned.

[30] Foreign Application Priority Data

Dec. 26, 1985 [JP] Japan .................. 60-291933
Dec. 26, 1985 [JP] Japan .................. 60-291934

[51] Int. Cl.$^4$ ............... G03B 7/095; G03B 7/16; G03B 15/05
[52] U.S. Cl. .................... 354/415; 354/423; 354/446
[58] Field of Search ............. 354/415, 423, 446

[56] References Cited

U.S. PATENT DOCUMENTS

| | | | |
|---|---|---|---|
| 4,327,978 | 5/1982 | Ishida et al. | 354/415 |
| 4,484,807 | 11/1984 | Kataoka et al. | 354/415 |
| 4,501,481 | 2/1985 | Kataoka et al. | 354/415 X |

Primary Examiner—Michael L. Gellner
Attorney, Agent, or Firm—Robin, Blecker & Daley

[57] ABSTRACT

In a system for setting the aperture in a camera for flash photography, a minimum aperture is computed in response to parameters such as distance to an object, stroboscopic guide number and film sensitivity. In one embodiment, a predetermined aperture value is preestablished in the system and the computed minimum aperture is compared therewith. Where the computed minimum aperture is below such predetermined aperture value, such computed minimum aperture is used in flash photography. On the other hand, when the computed minimum aperture is above such predetermined aperture value, an aperture larger than the predetermined minimum aperture value is used in flash photography. Other embodiments for flash aperture setting are also set forth.

14 Claims, 15 Drawing Sheets

F I G. 1(A)
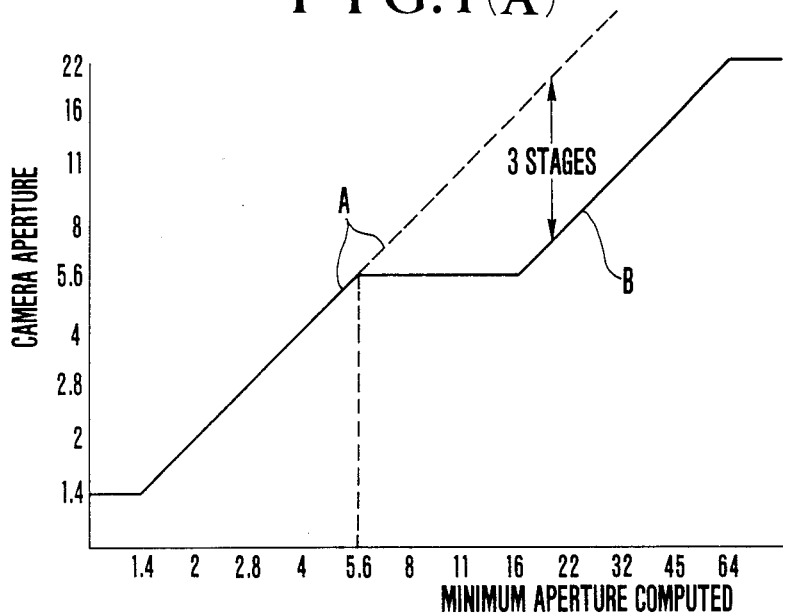
F I G. 1(B)
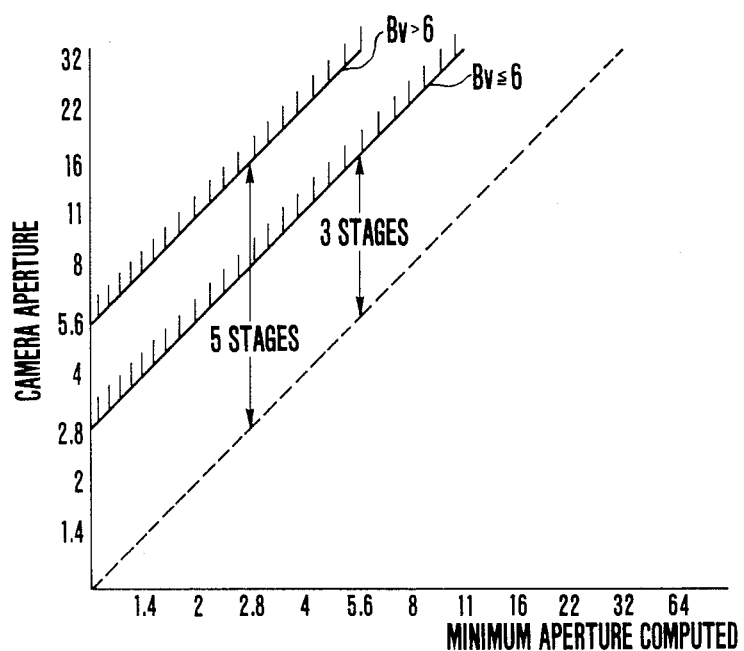

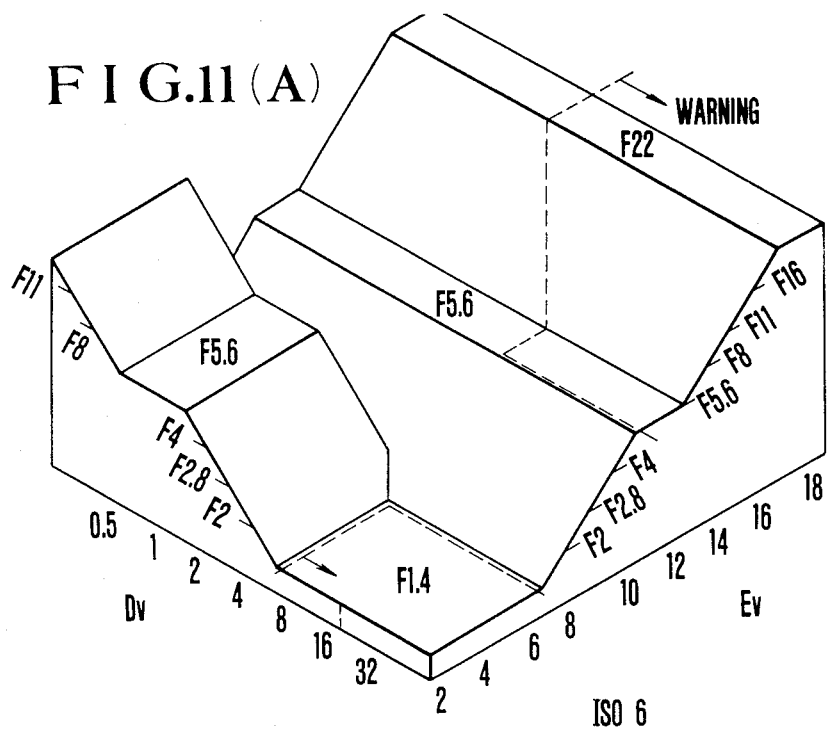
F I G.11(A)
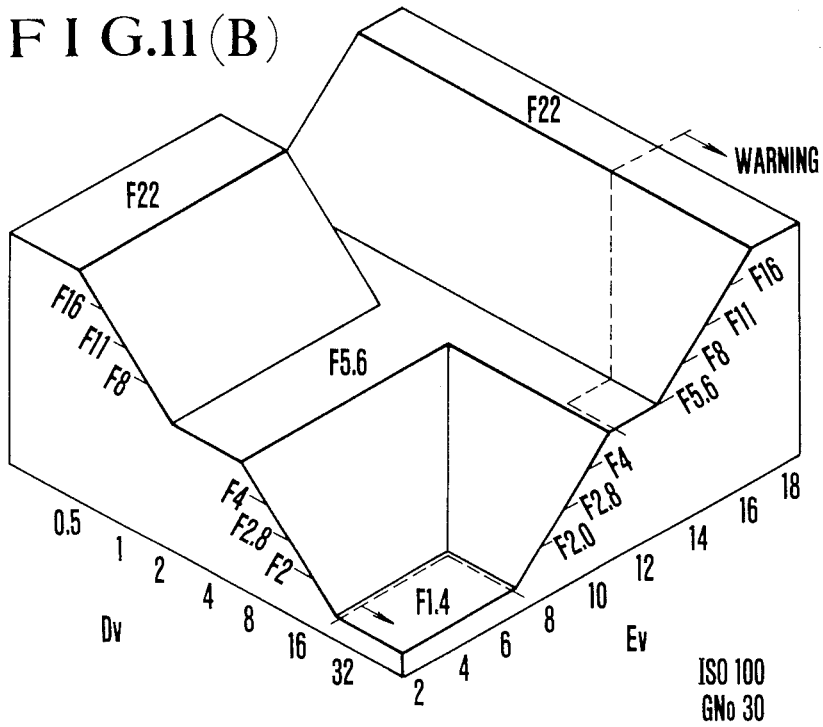
F I G.11(B)

| DISTANCE (m) Dv | QUANTITY OF LIGHT Pv | | GNo | Gv |
|---|---|---|---|---|
| 1 | 0 | 1 | -5 | 1 | 0 |
| 1.4 | 1 | 1.4 | -4 | 1.4 | 1 |
| 2 | 2 | 2 | -3 | 2 | 2 |
| 2.8 | 3 | 2.8 | -2 | 2.8 | 3 |
| 4 | 4 | 4 | -1 | 4 | 4 |
| 5.6 | 5 | 5.6 | 0 | 5.6 | 5 |
| 8 | 6 | 8 | 1 | 8 | 6 |
| 11 | 7 | 11 | 2 | 11 | 7 |
| 16 | 8 | 16 | 3 | 16 | 8 |
| 22 | 9 | 22 | 4 | 22 | 9 |
| 32 | 10 | 32 | 5 | 32 | 10 |
| 45 | 11 | 45 | 6 | 45 | 11 |
| 64 | 12 | 64 | 7 | 64 | 12 |

FIG.14

| HEXADECIMAL NUMBER | APEX | Tv (SEC.) | Av | Sv | Dv [m] |
|---|---|---|---|---|---|
| 00 | 0 | | | | |
| 08 | 1 | 1 | 1.4 | 6 | 1.4 |
| 10 | 2 | 1/2 | 2 | 12 | 2 |
| 18 | 3 | 1/4 | 2.8 | 25 | 2.8 |
| 20 | 4 | 1/8 | 4 | 50 | 4 |
| 28 | 5 | 1/15 | 5.6 | 100 | 5.6 |
| 30 | 6 | 1/30 | 8 | 200 | 8 |
| 38 | 7 | 1/60 | 11 | 400 | 11 |
| 40 | 8 | 1/125 | 16 | 800 | 16 |
| 48 | 9 | 1/250 | 22 | 1600 | |
| 50 | 10 | 1/500 | 32 | | |
| 58 | 11 | 1/1000 | | | |
| 60 | 12 | 1/2000 | | | |
| 68 | 13 | 1/4000 | | | |
| 70 | 14 | | | | |
| 78 | 15 | | | | |
| 80 | 16 | | | | |
| 88 | 17 | | | | |
| 90 | 18 | | | | |
| 98 | 19 | | | | |
| A0 | 20 | | | | |
| A8 | 21 | | | | |
| B0 | 22 | | | | |
| B8 | 23 | | | | |

FIG.15

A/D CONVERTED VALUE

| | |
|---|---|
| $\frac{255}{256} V_c$ | FFH |
| $\frac{15}{16} V_c$ | F0H |
| $\frac{14}{16} V_c$ | E0H |
| $\frac{13}{16} V_c$ | D0H |
| $\frac{12}{16} V_c$ | C0H |
| ⋮ | ⋮ |
| $\frac{8}{16} V_c$ | 80H |
| ⋮ | ⋮ |
| 0 | 00H |

FIG.16

D/A CONVERTED VALUE

| | |
|---|---|
| 08H | $V_c$ |
| 10H | $V_c - \frac{kT}{q} \ln 2$ |
| 18H | $V_c - 2 \times \frac{kT}{q} \ln 2$ |
| 20H | $V_c - 3 \times \frac{kT}{q} \ln 2$ |
| 28H | $V_c - 4 \times \frac{kT}{q} \ln 2$ |
| ⋮ | ⋮ |
| 48H | $V_c - 8 \times \frac{kT}{q} \ln 2$ |

APERTURE DECISION SYSTEM FOR FLASH PHOTOGRAPHING

BACKGROUND OF THE INVENTION

1. Field of the Invention

The present invention relates to an improvement of an aperture controlling system for obtaining an optimal aperture, at the time of flash photographing, from a distance to an object, a guide number (at full light emission) of a strobodimmer, a film photosensitivity and other conditions.

2. Description of the Related Art

If F be an aperture and D a distance to an object, then a guide number GNo of a stroboscope will be:

$$GNo = F \times D \tag{1}$$

Further, if a quantity of light is denoted by P, a brightness Eo on an object surface will be expressed by Eq. (2) from it being in inverse proportion to the square of the distance D:

$$Eo \, \alpha \, \frac{P}{D^2} \tag{2}$$

Against the brightness Eo of the object surface, a brightness E of a film surface is in inverse proportion to the square of the aperture F, therefore $$E \, \alpha \, \frac{Eo}{F^2} = \frac{P}{F^2 \cdot D^2} \tag{3}$$

The brightness E of the film surface must be weakened according as a film photosensitivity gets high, therefore if the film photosensitivity is denoted by S, the brightness E of the film surface must be inversely proportional to the film photosensitivity S. Thus, $$\frac{1}{S} \, \alpha \, \frac{P}{F^2 \cdot D^2} \tag{4}$$

$$\therefore S \cdot P \, \alpha \, F^2 \cdot D^2 = (GNo)^2$$

If Eq. (4) is subjected to a logarithm to the base 2, then all can be represented by APEX values.

$$\log_2 S + \log_2 P \, \alpha \, \log_2 F^2 + \log_2 D^2 = \log_2 (GNo)^2 \tag{5}$$

In Eq. (5), if $\log_2 (K_1 S) = Sv$, $\log_2 (K_2 P) = Pv$, $\log_2 F^2 = Av$, $\log_2 D^2 = Dv$, $\log_2 (GNo)^2 = Gv$ ($K_1$, $K_2$ being constants), then Eq. (5) will be simplified as:

$$Sv + Pv = Av + Dv = Gv \tag{6}$$

Sv and Av being defined formulaically, Pv, Dv and Gv will be defined here.

Pv is the quantity of light of a stroboscope, and its magnitude is decided generally with a guide number when ISO is 100, therefore it is defined by GNo when ISO is 100. Dv and Gv are then defined in a $\sqrt{2}$ sequence as in the case of Av. When defined as FIG. 13 on the premise above, Eq. (6) given above may hold accordingly.

When using a manual stroboscope (not for dimming), the guide number will be obtained in consideration of the film photosensitivity. Then, the distance is obtained from a lens distance ring as focusing the camera, and the aperture is calculated according to Eq. (1) to manual setting. Like result will be obtained from replacing with APEX values to a calculation on Eq. (6). Since an operation of the manual stroboscope involves a complication, there prevailing of late is an autostroboscope (dimmer type) which is ready for operation simply from setting the aperture. The construction is then such that the aperture Av is set by a photographer and the guide number Gv changes according to the distance Dv in Eq. (6). That is, it is ready for photographing by means of GNo coming less than the maximum GNo (at full light emission). In the case of strobodimmer, Eq. (6) can be rewritten as:

$$Av + Dv \leq Sv + Pv \, (max) = Gv \, (max) \tag{7}$$

and further as:

$$Av \leq Sv + Pv \, (max) - Dv \tag{8}$$

This is a basic APEX formula of the strobodimmer.

However, an unavoidable defect is such that Dv coming over a certain value or a certain distance may lead to a short of exposure.

Now, therefore, the photographer is inclined to expand a photographable range by using, as far as possible, an aperture on the open side. However, in this case where the object is not brought into accurate focusing before photographing, a photograph will be obtained out of focus, or since a dimming performance of the stroboscope is limited in a short distance photographing, an overexposure may result on the photograph.

To solve the aforementioned disadvantages, there is disclosed a strobodimmer system wherein a stroboscope preemits the light on the first stroke of a release button and detects the light reflected from a main object to measure the distance, and a camera operates a minimum aperture (on the most stopped-down side) ready for strobodimming according to a distance information from the stroboscope, a guide number (at full light emission) of the stroboscope and a film photosensitivity, and the camera is adjusted to the aperture thus operated in, for example, U.S. Pat Nos. 4,484,807, 4,501,481, 4,547,057, 4,610,525, 4,572,644, 4,569,580. Thus an out-of-focus condition will not be caused thereby, a proper exposure will be secured even at a short distance photographing, and a fairly long distance photographing can be realized.

Meanwhile, it is advantageous for continuous emission of the light that an excessively large dimming GNo be not used in a strobodimmer in consideration of recycle time. The aforementioned strobodimmer system is therefore not satisfactory in this respect.

In such strobodimmer system, furthermore, when a stroboaperture priority mode or a stroboshutter priority mode is set, if an aperture computed from an extraneous light luminance correspondingly to the aperture set by a photographer or the shutter speed comes toward an open side from the minimum aperture computed according to a distance information from the stroboscope, then the aperture set by the photographer may be a good one to set on the camera, however, if it comes toward a stopped-down side, the minimum aperture computed according to the distance information from the stroboscope will be the camera aperture, and thus there is a trend prevailing that the stroboscope has priority rather than an intention of the photographer.

SUMMARY OF THE INVENTION

An object of the invention is to solve the problems mentioned above and thus to provide an aperture controlling system for flash photographing which is capable of enhancing a continuous light emitting performance of a stroboscope.

One aspect of the application relates to an aperture controlling system effective in contracting a recycle time through the construction wherein a camera is adjusted to a minimum aperture ready for strobodimming which is computed from a distance to an object, a stroboscope guide number and a film photosensitivity when the minimum aperture comes below a predetermined value, but the camera is controlled to an aperture larger than the minimum aperture when the minimum aperture comes over the predetermined value.

Another aspect of the application is to provide an aperture controlling system wherein an alarm is given that a flash photographing is impracticable when a minimum aperture ready for strobodimming which is computed from a distance to an object, a stroboscope guide number and a film photosensitivity is greater by a constant stage number or over than the aperture computed by a photographer or the aperture computed from an extraneous light luminance, but a camera is controlled to the aperture set by the photographer or the aperture computed from an extraneous light luminance when the minimum aperture is not on an open side by a constant stage number or over.

Other and further objects of the invention will be apparent from the following description of an illustrative embodiment thereof.

BRIEF DESCRIPTION OF THE DRAWINGS

FIG. 1(A) and FIG. 1(B) are characteristic drawings representing one example of aperture control according to the invention;

FIG. 14 is a drawing showing a coordination between APEX values and hexadecimal numbers;

FIG. 15 is a drawing indicating A/D conversion values;

FIG. 16 is a drawing indicating D/A conversion values.

DETAILED DESCRIPTION OF THE PREFERRED EMBODIMENT

FIG. 1(A) and FIG. 1(B) are drawings illustrating an aperture control function according to the invention. According to the invention, a control is given, as shown in FIG. 1(A), such that the aperture is set as computed when the minimum aperture (line A) computed, for example, according to a distance, comes below a predetermined value (F5.6 for example), but a camera is set to an aperture (line B) opened further from the computed aperture by a predetermined stage number toward the open side when the minimum aperture comes over the predetermined value. Consequently, enough quantity of light may be secured even in case an object is remote, and where it stands a short distance away, an open aperture is preferred rather than the computed aperture, a flash photographing can be realized on the light less than that of being emitted through the computed aperture, and thus a recycle time can be contracted. Further in the invention, a control is made to have a set aperture or the aperture decided on an extraneous light luminance other than that in which the aperture (dotted line) computed according, for example, to a distance is opened further from aperture values (full lines) decided on the externally set aperture and the extraneous light luminance by 3 stages or more at $Bv \leq 6$ and 5 stages or more at $Bv > 6$. This may permit a photographer to give priority to the aperture set by himself or the aperture decided on an extraneous light luminance.

Figure 2:
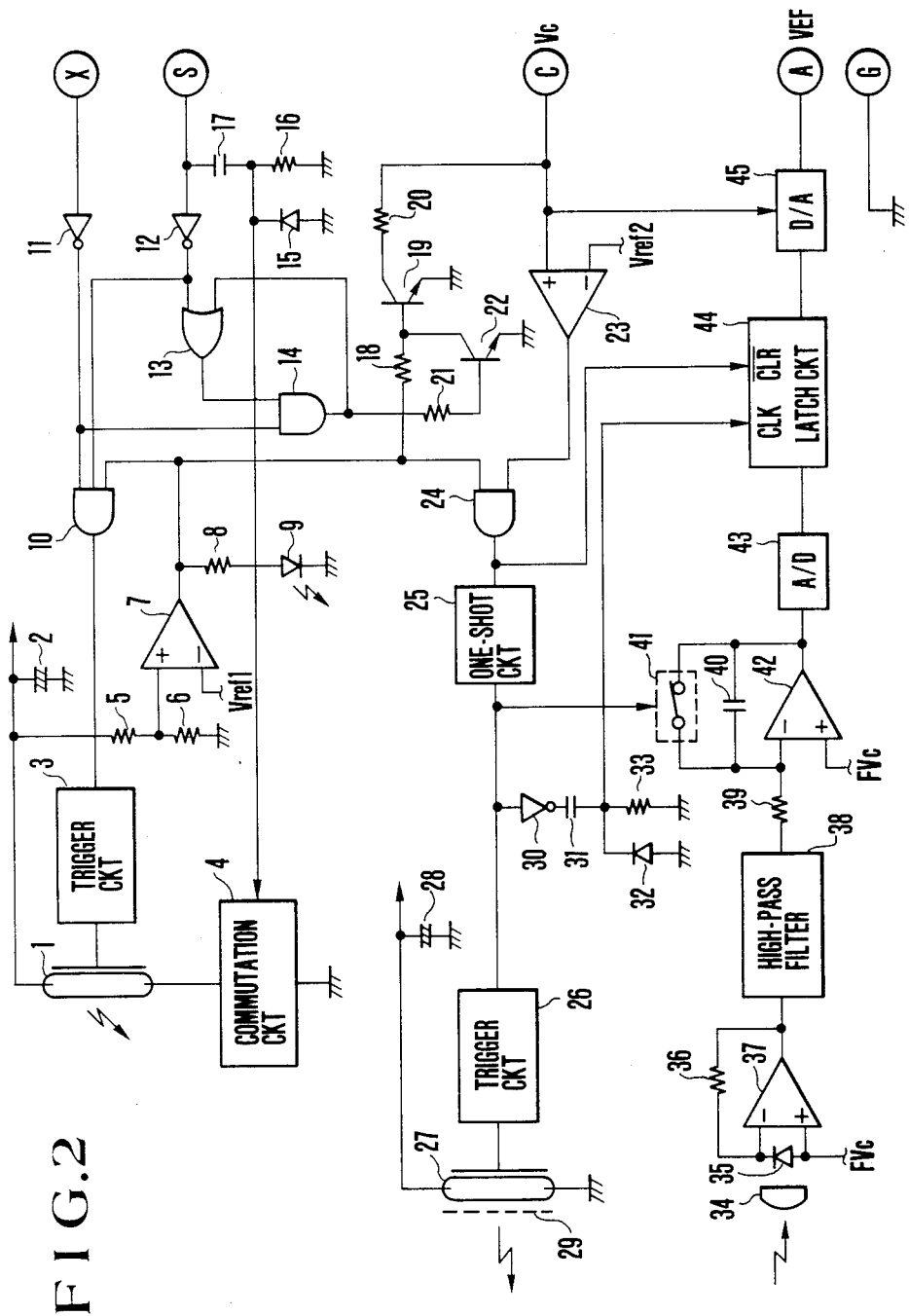
FIG. 2 is a circuit diagram representing one example of a stroboscope used for putting the invention into practice.

FIG. 2 represents a stroboscope circuit used for putting one example of the invention into practice.

A reference character X denotes a terminal connected to X contact of a known camera side, S denotes a terminal for inputting signals indicating a state ready for luminosity at low level and luminosity stop at high level from the camera side, C denotes a terminal for inputting a constant voltage Vc from the camera side, A denotes a terminal for outputting APEX values of apertures to the camera side as voltage, G denotes a terminal to be grounded, all being connected to corresponding terminals of the camera.

A reference numeral 1 denotes a xenon discharge tube for main light emission, 2 denotes a main capacitor charged by a DC-DC converter which is not indicated, 3 denotes a known trigger circuit, 4 denotes a commutation circuit connected in series to the xenon discharge tube for main light emission, 5, 6 denote resistances, 7 denotes a comparator having a constant voltage Vrefl generated in a stroboscope impressed on the inversion input end, and the comparator 7 outputs a high level charge completion signal whenever a charge voltage of the main capacitor 2 reaches a predetermined value. A reference numeral 8 denotes a resistance, 9 denotes a light emitting diode working as a charge completion display means, 10 denotes an AND gate, 11, 12 denote inverters, 13, 14 denote an OR gate and an AND gate forming a flip-flop, 15, 16, 17 denote a diode, a resistance and a capacitor which form a differentiating circuit for detecting rise only of a pulse inputted to the terminal S, 18 denotes a resistance, 19 denotes a transistor turned on according to the charge completion signal, leading in a current from a camera side by way of a resistance 20 and a terminal C, thereby transferring the stroboscope being ready for light emission to the camera side, 21 denotes a resistance, 22 denotes a transistor turned on to turn the transistor 19 off, thereby transferring ring the stroboscope starting for light emission to the camera side, 23 denotes a comparator having a constant voltage Vref2 (<Vc) impressed on the inversion input end, thereby detecting whether or not the constant voltage Vc is inputted to the terminal C from the camera side, 24 denotes an AND gate, 25 denotes a one-shot circuit for outputting a pulse having a width of constant duration which is longer than a preemitted light, 26 denotes a trigger circuit, 27 denotes a xenon discharge tube for light preemission, 28 denotes a capacitor for light preemission, 29 denotes an infrared filter, 30 denotes an inverter, 31, 32, 33 denote a capacitor, a diode and a resistance forming a differential circuit for detecting rise only of a pulse output from the inverter 30 (or fall of an output pulse of the oneshot circuit 25), 34 denotes a lens for specifying an angle of received light, 35 denotes a silicon photodiode for receiving the light that infrared rays of the xenon discharge tube 27 for light preemission reflect on an object, 36, 37 denote a resistance and an operational amplifier for converting a current of the silicon photodiode 35 into voltage, 38 denotes a high-pass filter, 39, 40, 41, 42 denote a resistance, an integrating capacitor, an analog switch and an operational amplifier which form an integrating circuit, 43 denotes an A/D coverter, 44 denotes a latch circuit operating for clearing motion on a low level output of the AND gate 24 and also for latching motion on a differential output from the resistance 33, 45 denotes a D/A converter, and FVc denotes a constant voltage generated in the stroboscope.

Figure 3:
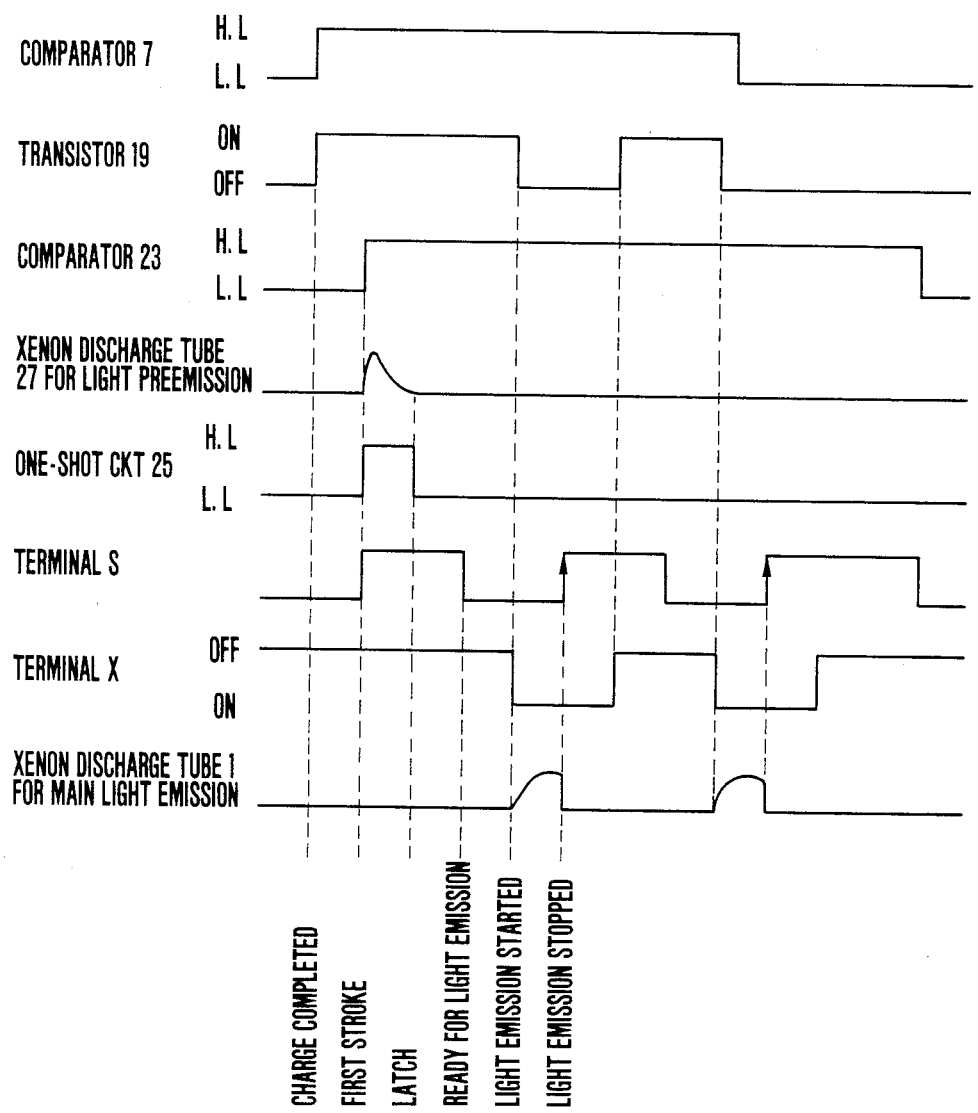
FIG. 3 is a timing chart showing an operation of each part of the circuit indicated in FIG. 2.

A flash operation will now be described with reference to the timing chart given in FIG. 3.

Figure 4:
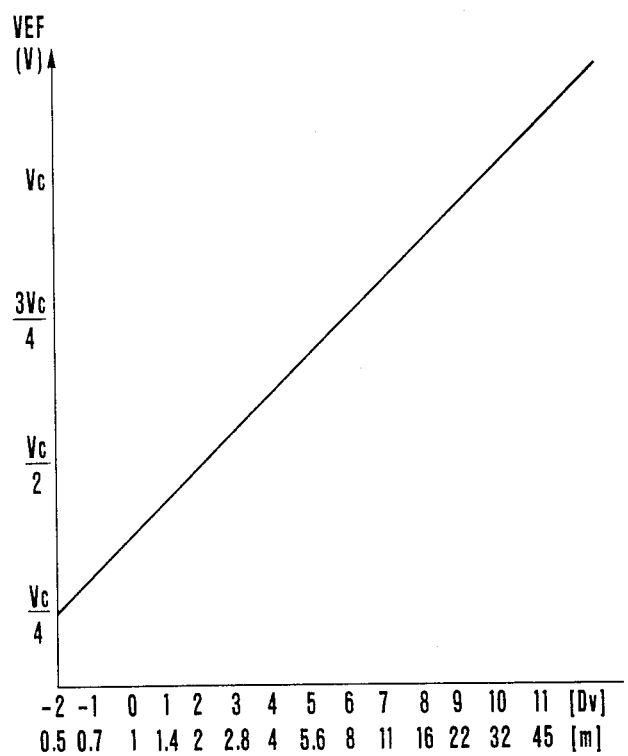
FIG. 4 is a drawing representing one example of a distance information of the stroboscope.

Upon turning on a power switch (not indicated) of the stroboscope, the main capacitor 2 and the capacitor 28 for light preemission are charged. When a charging voltage of the main capacitor 2 develops to the voltage ready for light emission of the xenon discharge tube 1 for main light emission, the comparator 7 outputs a high level charge completion signal, and thus the light emitting diode 9 is actuated to indicate a charge completion. The transistor 19 is turned on concurrently. Then, from depressing a first stroke of a release button of the camera, the constant voltage Vc is impressed on the terminal C from a camera side, and from leading in a current through the terminal C, a state ready for light emission is transferred to the camera side. Then, an output of the comparator 23 gets high in level, an output of the AND gate 24 also gets high in level, and the one-shot circuit 25 operates. Thus the xenon discharge tube 27 for light preemission is actuated to radiate infrared rays on an object. The reflected light is then incident on the silicon photodiode 35, and a voltage according to a brightness of the object is obtained from the operational amplifier 37. The high-pass filter 38 removes a natural light almost not changing as compared with a waveform of the preemitted light and passes only the preemitted light waveform. The voltage is proportional naturally to the inverse square of the distance. The analog switch 41 is kept off while an output of the one-shot circuit 25 is high in level, therefore an output voltage of the high-pass filter 38 is integrated by the current flowing through the resistance 39 and the integrating capacitor 40 and then output from the operational amplifier 42. The integrated output is converted into a digital value through A/D converter 43 and stored by the latch circuit 44 at a fall time of an output pulse of the one-shot circuit 25. The stored digital value is converted into a voltage easy to handle as $(11+Dv-Pv(max)) \times Vc/16$ through the D/A converter 45 according to the constant voltage Vc of the terminal C and transferred to the camera side as analog distance information VEF. One example of the analog distance information VEF, Pv=5 [GNo=32 (ISO 100)] is shown in FIG. 4.

The camera side processes the analog distance information VEF to obtain Av value and thus controls the camera apertures. From depressing a second stroke of the release button thereafter, a voltage of the terminal S comes first to a low level, a synchro switch is then turned on according to a running shutter, and a voltage of the terminal X gets low in level. Thus, an output of the AND gate 10 becomes high in level, the trigger circuit 3 operates, and the xenon discharge tube 1 for main light emission is actuated. An output of the AND gate 14 gets high in level at the same time, and the transistor 19 is turned off while the transistor 22 is turned on. The current is stopped from flowing into the terminal C, consequently. On the other hand, the camera comes to operate for TTL and diming of reflection on the film surface. Then, whenever reaching a proper level, the voltage of the terminal S comes to a high level, a differential pulse arising on the resistance 16 at the rise is inputted to the commutation circuit 4, and the xenon discharge tube 1 for main light emission is stopped from emission. FIG. 3 represents the case where a charge completion state is maintained while the first flash emission is over, and the charge completion state is cleared by the second flash emission. Then, it goes without saying that a distance information (Pv (max)−Dv) transferred from the terminal A to the camera side may be given in a digital value instead of the analog.

Figure 5:
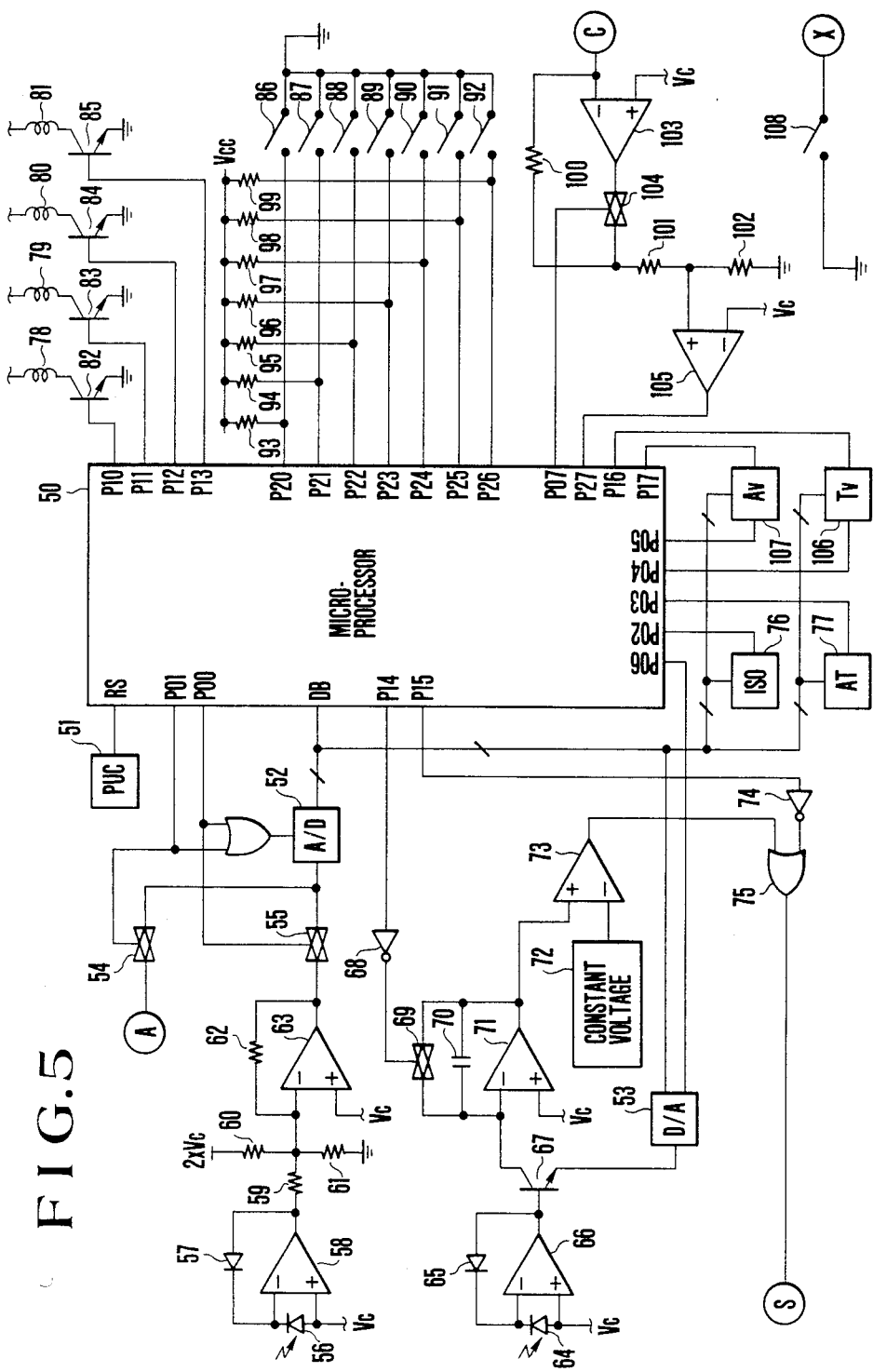
FIG. 5 is a circuit diagram representing one example of a camera for putting the invention into practice thereon.

FIG. 5 shows a circuit on the camera side for putting one example of the invention into practice.

A reference numeral 50 denotes a single-chip microprocessor having ROM, RAM in a chip, which is provided with 24 separate input/output ports, a reset terminal RS and 8-bit parallel data bus terminal DB. A hexadecimal number is used for internal arithmetic operation of the microprocessor 50, and the hexadecimal numbers given in FIG. 14 are made to coordinate with various APEX values of the camera. For example, F 1.4 corresponds to APEX 1 and is 08H (H indicating hexadecimal number) accordingly. The shutter speed 1/4000 is APEX 13 and 68H. For easy understanding, the lens open aperture is set at F 1.4, the lens minimum aperture is set at F 32, the highest shutter speed is set at 1/4000 sec., the synchronizing speed is set at 1/250 to 1/00 sec. and the lowest speed is set at 1 sec., however, it goes without saying that these values are not necessarily imperative.

A reference numeral 51 denotes a power-up clear circuit for outputting a power-up clear signal for a certain period of time when a power is closed from a supply circuit which is not indicated therein, 52 denotes an A/D converter for converting analog voltages 0 to Vc into 256 stages of digital values shown in FIG. 15, 53 denotes a D/A converter for converting a digital value from the microprocessor 50 into analog voltage shown in FIG. 16, 54, 55 denote analog switches, 56 denotes a silicon photodiode for measuring brightness of an object, 57 denotes a diode for logarithmic compacting, 58 denotes an operational amplifier, 59 to 62 denote resistances, 63 denotes an operational amplifier, 64 denotes a silicon photodiode for measuring a film reflected light of the stroboscope, 65 denotes a diode for logarithmic compacting, 66 denotes an operational amplifier, 67 denotes an expanding transistor, 68 denotes an inverter, 69 denotes an analog switch, 70 denotes an integrating capacitor for strobodimming, 71 denotes an operational amplifier, 72 denotes a constant voltage source, outputting a reference voltage of a dimming comparator. For convenience' sake, the reference voltage is specified at Vc +1.0V.

A reference numeral 73 denotes a dimming comparator, 74 denotes an inverter, 75 denotes an OR gate, 76 denotes a film photosensitivity ISO input circuit, 77 denotes a set point input circuit for inputting a set point of the shutter speed at the time of shutter priority mode and a set point of the aperture at the time of aperture priority mode, 78 denotes a first tension magnet for releasing a first tension of the camera and actuating a mechanical release sequence, 79 denotes an aperture control magnet for controlling automatically an aperture of the camera, 80 denotes a leading curtain magnet for running a shutter leading curtain, 81 denotes a trailing curtain magnet for running a shutter trailing curtain, 82 to 85 denote transistors.

A reference numeral 86 denotes a first stroke switch getting on at the first stroke of the release button, which is ready for starting photometry on the camera. A reference numeral 87 denotes a second stroke switch getting on at the second stroke of the release button, which is ready for starting shutter release of the camera. A reference numeral 88 denotes an aperture switch interlocking with the automatic diaphragm, getting on/off once whenever the camera is stopped down at $\frac{1}{8}$ stage. A reference numeral 89 denotes a mirror-up switch getting on at holding up a mirror, 90 denotes a trailing curtain switch getting on when the trailing curtain has run, 91 denotes a first mode setting switch for setting a shutter priority mode from being off and an aperture priority mode from being on, 92 denotes a second mode setting switch for setting a program mode prior to the mode set by the first mode setting switch from its being off, 93 to 99 denote pull-up resistances, 100 to 102 denote resistances, 103 denotes an operational amplifier, 104 denotes an analog switch, 105 denotes a comparator, 106 denotes a shutter speed display circuit, latching data of a data bus at rise of the port P04, thereby carrying out a display corresponding to the data. Then, when a signal level of the port P16 is high, the display is blinked to provide warning. A reference numeral 107 denotes an aperture display circuit, latching data of the data bus at rise of the port P05, thereby carrying out a display corresponding to the data. Then, when a signal level of the port P17 is high, the display is blinked to provide warning. A reference numeral 108 denotes an X contact. Vc, Vcc, 2xVc denote constant voltages fed from a power circuit which is not indicated therein.

Figure 6:
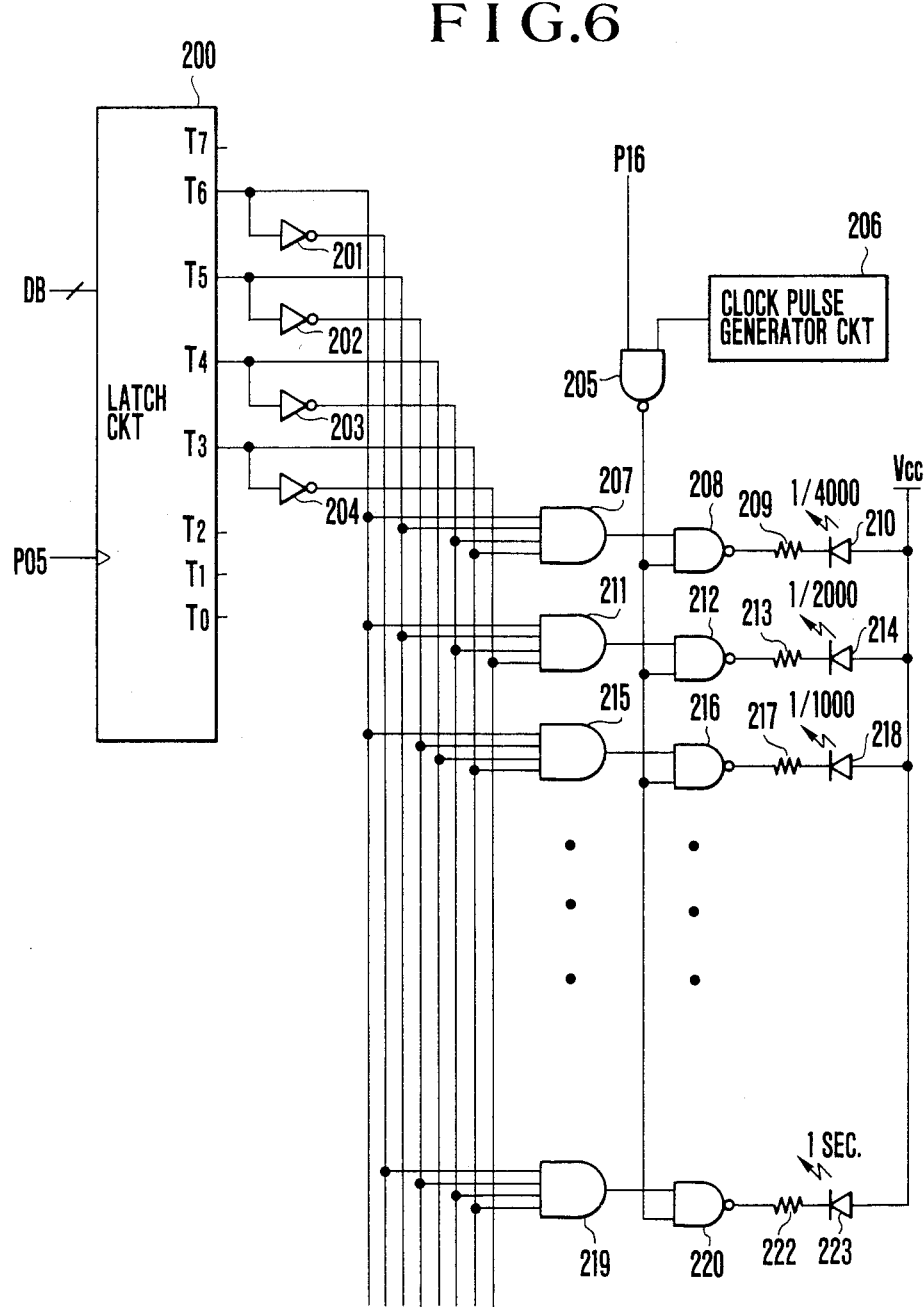
FIG. 6 is a circuit diagram representing one example of a shutter speed display circuit.

The shutter speed display circuit 106 and the aperture display circuit 107 are of a circuit configuration, therefore one example of the shutter speed display circuit 106 will be shown in FIG. 6.

A reference numeral 200 denotes a latch circuit, latching data of the data bus at rise of the port P05 of the microprocessor 50. The output terminals $T_0$ to $T_3$ represent a first digit of the hexadecimal number, and those $T_4$ to $T_7$ represent a second digit of the hexadecimal number. Reference numerals 201 to 204 denote inverters, 205 denotes a NAND gate, outputting a high level when the port P16 of the microprocessor 50 is low in level but inverting and outputting a clock pulse when it is high in level. A reference numeral 206 denotes a clock pulse generator circuit for blinking display, 207, 208, 209, 210 denote an AND gate, a NAND gate, a resistance and a light emitting diode for indicating 1/4000 sec. when an output of the latch circuit 200 is 68H to 6FH, and when the output port P16 comes to a high level, the light emitting diode 210 blinks to warning. Reference numerals 211 to 214 denote a set of like elements indicating 1/2000 sec. when an output of the latch circuit 200 is 60H to 67H, 215 to 218 denote a set of like elements indicating 1/1000 sec. when the output of the latch circuit 200 is 58H to 5FH, 219 to 223 denote a set of elements indicating 1 sec. when the output of the latch circuit 200 is 08H to 0FH.

An operation of the microprocessor 50 will be described with reference to the flowcharts given in FIG. 7 to FIG. 9.

In describing the flowcharts, the ports P00 to P07 will be called "PORT0" collectively. Then, the ports P10 to P17 will be called "PORT1". When the ports are operated one by one or, for example, the port P01 is made to be a high level, the notation will be P01←1. When made to be a low level, the notation will be P01←0 likewise. When operating PORT0 including the eight ports collectively or, for example, P17, P16, P15, . . . P10 of PORT1 are to read 10100101, the notation will be such PORT1←A5H.

In case data is inputted from the A/D converter 52, a necessary operation may be such that a photometry is selected with P00←1 first, an 8-bit data is read from a data bus terminal DB after A/D conversion of the photometry information is over, and then A/D conversion selection is cleared with P00←0 therefor, however, the above will be omitted to the following notation:

ACC←(AEAD)

where ACC indicates an accumulator. When an analog distance information is subjected to A/D conversion at P01:

ACC←(EFAD)

When ISO information is inputted at P02:

ACC←(ISO)

When a set point is inputted at P03:

ACC←(ATP)

In case a data is output to the shutter speed display circuit 106 and others, an 8-bit data is output, with P04←1 therefor, to the data bus terminal DB from the accumulator ACC, and then latched with P04←0, thus the notation being as:

(TvDISP)←ACC

Likewise, an output to the aperture display circuit 107 will be notational as:

(AvDISP)←ACC and an output to the D/A converter 53 as:

(DAP)←ACC

When a power is closed from a power circuit which is not indicated therein, the power-up clear circuit 51 outputs a low level for a certain period of time, and the microprocessor 50 is thus reset. The reset microprocessor 50 then executes programs in sequence from A of the flowchart of FIG. 7.

1 PORT0←00H, PORT1←00H

Outputs of the ports P00 to P07 and P10 to P17 are all turned to low level. Thus the A/D converter 52, the film photosensitivity ISO input circuit 76, the set point input circuit 77, the shutter speed display circuit 106, the aperture display circuit 107 and the D/A converter 53 are kept from selection, the magnets 78 to 81 are all turned off, the strobodimming integrating capacitor 70 is discharged, a voltage on the terminal S is made to a high level, and flickering of the shutter speed display circuit 106 and the aperture display circuit 107 is transferred to lighting.

2 (TvDISP)←00H, (AvDISP)←00H

The display is put out by outputting 00H to the shutter speed display circuit 106 and the aperture display circuit 107.

3 P20

The port P20 is sensitized. If the first stroke switch 86 is kept off, then #1, #2 and #3 loops are repeated to await the first stroke switch 86 getting on.

"Stroboprogram Mode"

Let it be assumed, now, the camera has been charged already, the trailing curtain switch 90 is turned off, and the main capacitor 2 (FIG. 2) of the stroboscope has completed charging. Further, the assumption is such that the second mode setting switch 92 is kept off, and the program mode has been set. The photographer catches an object through finder, and when the first stroke of the release button is depressed, the first stroke switch 86 is turned on, and the camera is ready for photometry. It branches to #4 according to a branch instruction #3 in FIG. 7.

4 ACC←(AEAD)

A brightness Bv of the extraneous light is measured on the silicon photodiode 56.

Assuming a current Ispd flowing through the silicon photodiode 56 when $Bv=0$ is $i_o$, $Ispd = 2^{Bv} \times i_o$ at the brightness Bv.

Assuming an output voltage of the operational amplifier 58 is $V_{58}$:

$$V_{58} = Vc + \frac{kT}{q} \cdot Bv \ln \frac{2i_o}{I_s}$$

where
k: Boltzmann constant
q: electron charge
T: absolute temperature
$I_s$: counter saturation current Then, if values of the resistances 59, 62, 60, 61 be $R_1$, $R_2$, $R_3$, $R_4$ respectively, an output $V_{63}$ of the operational amplifier 63 can be expressed as:

$$V_{63} = Vc - \frac{R_2 kT}{R_1 q} Bv \ln 2 -$$

$$\frac{R_2 kT}{R_1 q} \ln \frac{i_o}{I_s} + \left( \frac{R_2}{R_4} - \frac{2R_2}{R_3} \right) Vc$$

From selecting resistance values $R_1$, $R_2$, $R_3$, $R_4$ so as to have:

$$\frac{R_2 kT}{R_1 q} \ln 2 = \frac{1}{32} Vc,$$

$$\frac{kT}{R_1 q} \ln \frac{i_o}{I_s} = \left( \frac{1}{R_4} - \frac{2}{R_3} \right) Vc$$

then
$V_{63} = Vc (1 - Bv/32)$

5 Bv←—ACC

The brightness Bv of the extraneous light is inverted by the operational amplifier 63, therefore it is returned to what it stands originally by taking a hexadecimal negative number. For example, A/D converted value is F8H when $Bv=1$ but when the hexadecimal negative number is taken, it becomes 08H or APEX value $Bv=1$. The A/D converted value becomes C0H when $Bv=8$, and the negative number is 40H. The value is then loaded in the register Bv.

6 Sv←(ISO)

APEX code of ISO is inputted from the film photosensitivity ISO input circuit 76 and loaded in the register Sv.

7 Ev←Bv+Sv

Ev value is computed from the extraneous light brightness Bv and the film photosensitivity Sv and loaded in a register Ev.

8 P07←1

The analog switch 104 is turned on with the port P07 kept at high level. Then, an output of the operational amplifier 103 is fed back by way of the resistance 100, therefore a voltage on the terminal C rises. Now, if the stroboscope is charged, then a constant current is sucked in through the terminal C, therefore an output voltage of the operational amplifier 103 gets higher than Vc. Accordingly, a voltage on non-turnover input end of the comparator 105 also exceeds Vc, and thus an output of the comparator 105 is turned over to a high level. In this case, the stroboscope preemits infrared rays on a rise of the voltage on the terminal C, a distance to the object is thus measured, converted into an analog voltage and output from the terminal A as analog distance information VEF.

9 P27

An output of the comparator 105 is discriminated.

Figure 8:
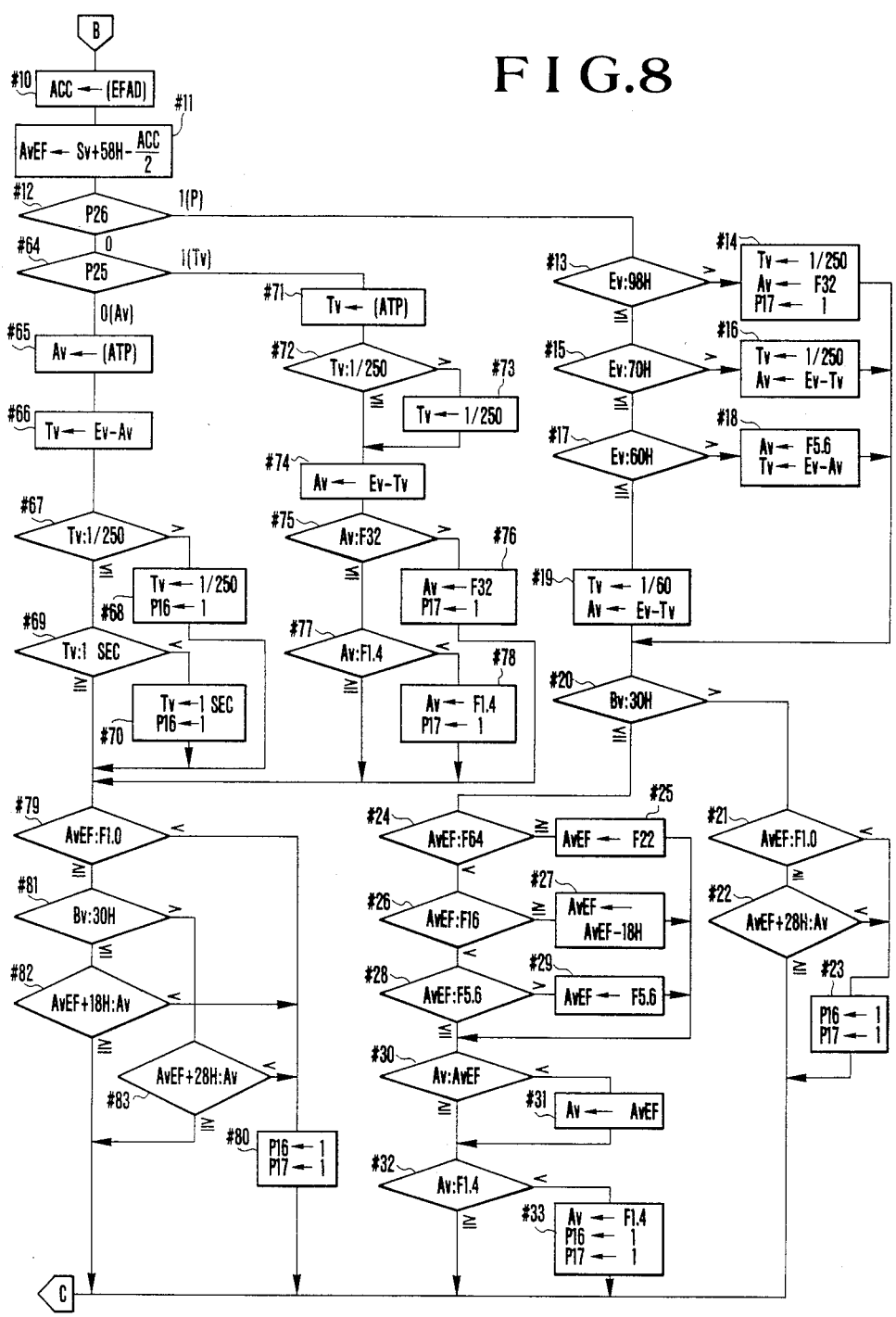

When the stroboscope has been charged, the output of the comparator 105 is on a high level as described at #8, therefore it branches to #10 of FIG. 8 by way of B.

10 ACC←(EFAD)

The analog distance information VEF from the stroboscope is converted into a digital value and loaded in the accumulator.

11 AvEF←Sv+58H−ACC/2

A minimum aperture (APEX value) is computed according to the digital distance information and loaded in a register AvEF. In this case, 58H is a constant. The reason why ACC is halved is that the first stage Vc/16 on the stroboscope side is to be converted into the first stage Vc/32 on the camera side.

For example, the aperture will be $32 \div 8 = F4$ to the object ISO 100, $GNo=32$ and 8 m in distance, therefore a voltage on the terminal A is 3 Vc/4 from FIG. 4 and the A/D converted value is C0H, $$AvEF = 28H + 58H - C0H/2$$
$$= 20H$$

that s, a code of F4 aperture.

12 P26

A status of the second mode setting switch 92 will be discriminated. Since the program mode is selected now, it is kept off, and the program is branched to #13.

Figure 10:
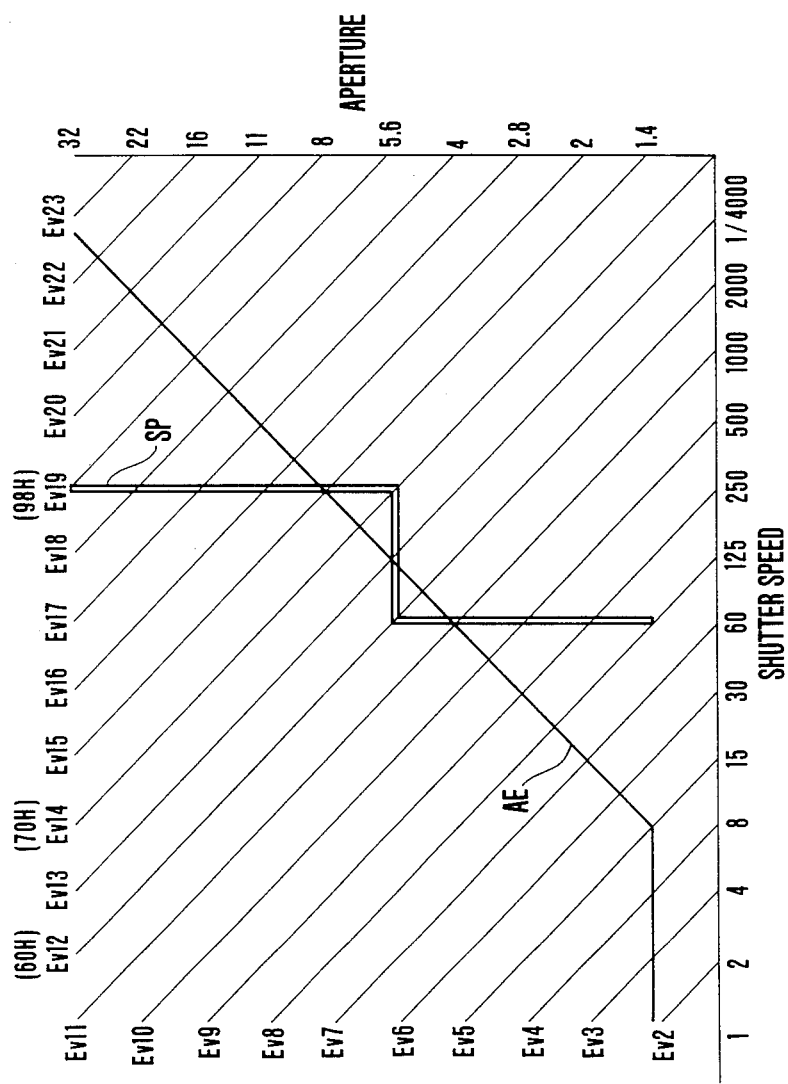
FIG. 10 is a program diagram of a flash mode and AE mode.

In #13 to #19, a shutter speed and an aperture conforming to the stroboprogram line SP shown in FIG. 10 will be decided according to the Ev value computed at #7.

13 Ev : 98H

The Ev value is compared with APEX 19 (98H in hexadecimal number), and where it is greater, the program goes forward to #14.

14 Tv←1/250, Av←F32, P17←1

The shutter speed is synchronized at 1/250 sec. and the aperture is minimized at F32 on the camera, but the extraneous light is nevertheless overwhelming, therefore the aperture display circuit 107 is operated to flicker for warning.

15 Ev : 70H

The Ev value is compared with APEX 14 (70H in hexadecimal number), and where it is greater, the program is branched to #16.

16 Tv←1/250, Av←Ev−Tv

The shutter speed is synchronized at 1/250 sec. and the aperture is obtained through arithmetic operation. In this case, the aperture comes within F5.6 to F32.

17 Ev : 60H

The Ev value is compared with APEX 12 (60H in hexadecimal number), and where it is greater, the program is branched to #18.

18 Av←F5.6, Tv←Ev−Av

The aperture is set at F5.6, and the shutter speed is obtained through arithmetic operation. In this case, the shutter speed comes within 1/60 to 1/250.

19 Tv←1/60, Av←Ev−Tv

The shutter speed is set at 1/60 sec., and the aperture is obtained through arithmetic operation. In this case, the aperture comes within F.1.4 to F5.6.

In the operations #13 to #19, a combination of the shutter speed and the aperture appropriate to the extraneous light is obtained. Then, the shutter speed in this case will not lead to a slit exposure by synchronizing it selectively at 1/250 to 1/60 sec.

20 Bv : 30H

The program branches to #21 when the Bv value is APEX 6 (cloudy weather) or over but to #24 when it is less than 6.

21 AvEF : F1.4

When the extraneous light brightness Bv is valued at 6 or over, a daylight synchronous photographing is prevailing, so decided, to give the extraneous light priority, and a control is carried out according to the shutter speed and the aperture appropriate to the extraneous light which are obtained through #13 to #19. Accordingly, the stroboscope emits the light as auxiliary to the extraneous light in this case.

However, in case the minimum aperture AvEF computed according to a distance information from the stroboscope comes below F1.4, that is, a distance to the object at the time of ISO 100 exceeds 32 m, the flash light emission is not effective, and hence the program branches to #23.

22 AvEF+28H : Av

In case, further, the aperture Av appropriate to the extraneous light comes on the side 5 stages or more stopped down from the computed minimum aperture AvEF, that is, a full light emission of the stroboscope is still under 5 stages or more, the flash light emission is also not effective, and thus the program branches to #23.

23 P16←1, P17←1

For the stroboscope low luminance warning, the shutter speed display circuit 106 and the aperture display circuit 107 are operated to flickering simultaneously.

Where Bv≦6 at #20, the program branches to #24. The camera aperture will be decided according to the minimum aperture AvEF computed on the distance information from the stroboscope at #24 to #31.

24 AvEF : F64

When AvEF is greater than F64, the program branches to #25.

25 AvEF←F22

A stopped-down side of AvEF is limited by F22. #26 AvEF : F16

When AvEf is greater than F16, the program branches to #27.

27 AvEF←AvEF−18H

Where F16≦AvEF<F64, AvEF is decreased by 3 stages (18H). The reason is that when the distance is shorter than 2 m (ISO 100, GNo=30), the control is effective on an aperture 3 stages opened from the aperture through which the stroboscope emits the light full, the light emission on the guide number 3 stages less is to shorten a cycle time, thus permitting a continuous light emission. Then, since an aperture shift comes in 3 stages, the light emission can be stopped at an attenuated portion of the flash waveform even in a short distance photographing, thereby ensuring a proper exposure.

28 AvEF : F5.6

Where AvEF is greater than F5.6, the program branches to #29.

29 AvEF←F5.6

Where F5.6≦AvEF<F16, the aperture is fixed at F5.6.

Where AvEF comes below F5.6, the minimum aperture computed on the distance information from the stroboscope will be used as it stands. The reason is that when the object stands away from 5.6 m, an aperture, so selected, for full light emission is powerful enough to get the light full reaching a remote object. Further, an out-of-focus condition can be prevented as much as possible rather than fixed at open aperture F1.4.

30 Av : AvEF

The aperture AvEF according to the distance information from the stroboscope which is obtained at #24 to #29 is compared with the aperture Av according to the extraneous light which is obtained at #13 to #19.

#31 Av←AvEF

When the aperture AvEF comes on a stopped-down side from the aperture Av, that is, when the strobe light becomes a main light, the aperture AvEF according to a distance from the stroboscope is decided to be an aperture of the camera by substituting Av with AvEF. Apertures decided according to #24 to #31 are as shown in FIG. 1(A). Loops #24 to #31 relate to a feature of the invention.

Then, when the aperture AvEF comes on an open side from the aperture Av, that is, the extraneous light becomes a main light, the aperture Av according to the extraneous light is decided to be an aperture of the camera.

#32 Av : F1.4

The aperture Av is compared with F1.4.

#33 Av←F1.4, P16 and P17←1

When the aperture Av comes on an open side from the open aperture F1.4, the aperture of the camera is set to F1.4, while the shutter speed display circuit 106 and the aperture display circuit 107 are operated to flicker. Thus, it is warned that a proper exposure is not obtainable even through the extraneous light and the strobe light.

Figure 11C:
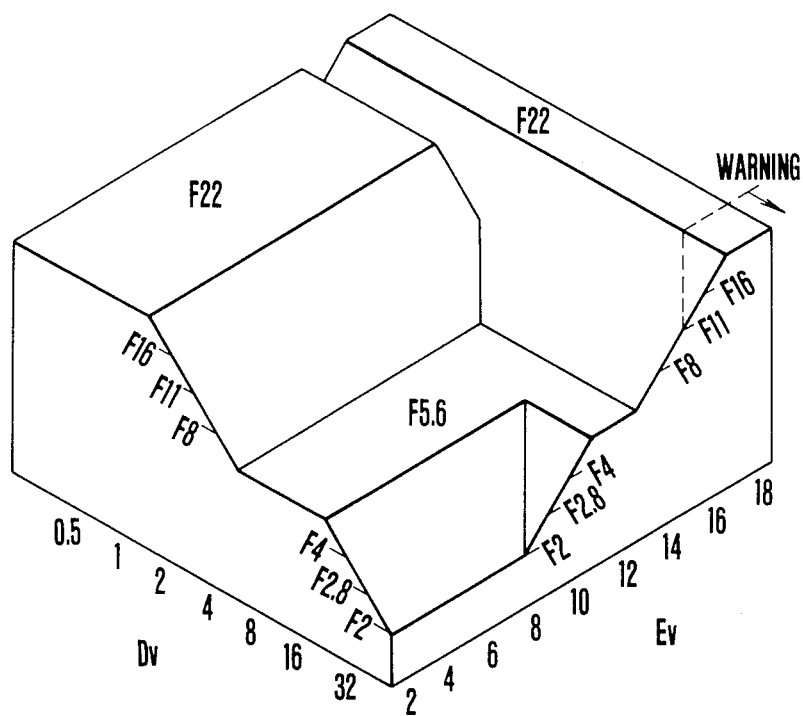
FIG. 11 (A), FIG. 11 (B) and FIG. 11 (C) are drawings showing apertures in the flash program mode.

Apertures decided at #13 to #33 are shown in FIG. 11(A), FIG. 11(B) and FIG. 11(C). FIG. 11(A) indicates the case of IS06, FIG. 11(B) indicates the case of IS0100, and FIG. 11(C) indicates the case of IS01600. In FIG. 11(A), FIG. 11(B) and FIG. 11(C), the lower side from a dotted line is a warning area.

Figure 7:
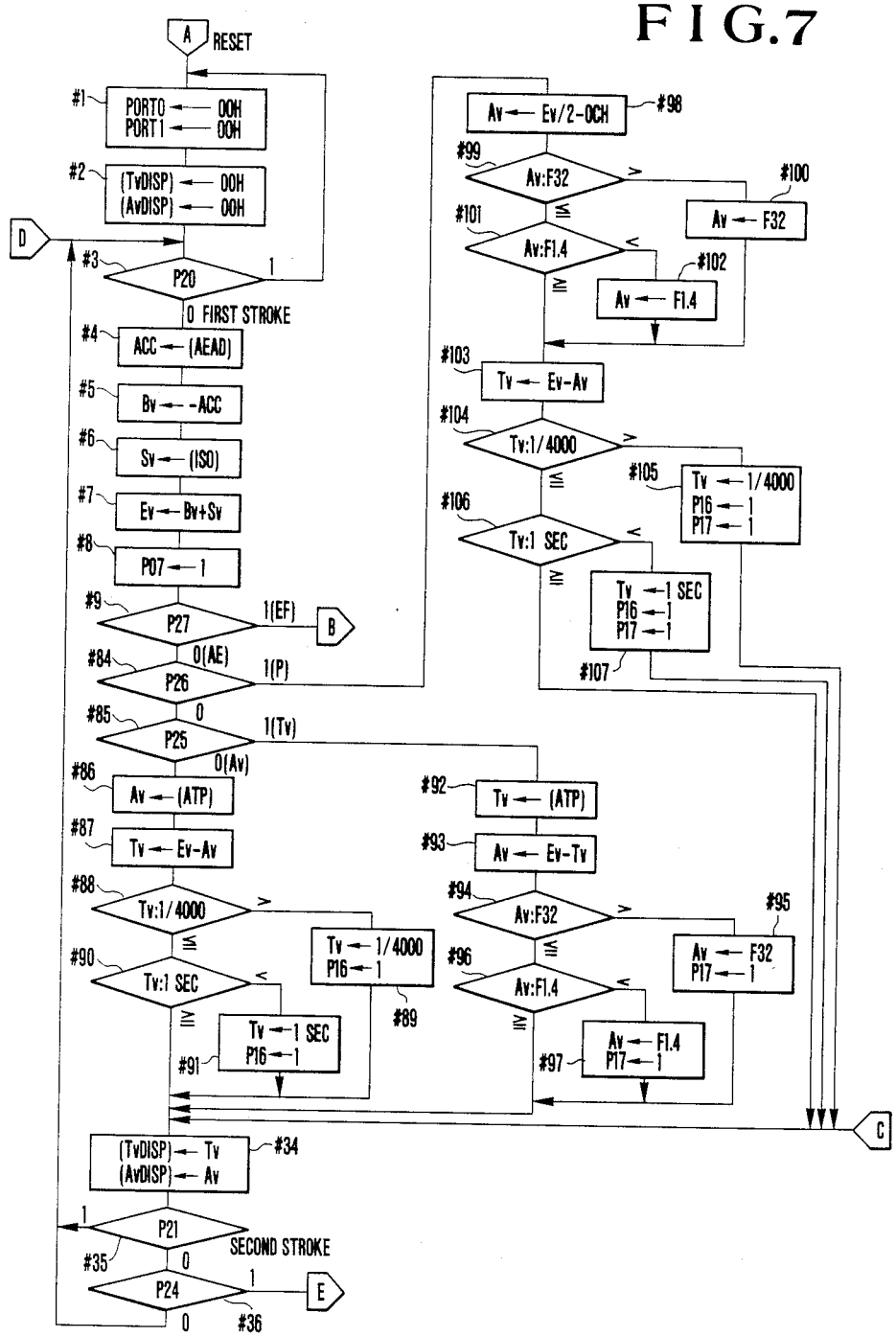
FIG. 7, FIG. 8 and FIG. 9 are flowcharts representing one preferred embodiment of the invention.

From #33 the program goes forward to #34 of FIG. 7 by way of C.

#34 (TvDISP)←Tv, (AvDISP)←Av

Shutter speeds and apertures are displayed.

#35 P21

The second stroke switch 87 is sensitized. Unless the second stroke switch 87 is turned on, the program returns to #3 and repeats the loops #3 to #34, thus repeating photometry and operation display. From depressing the release button as far as the second stroke, the second stroke switch 87 gets on, and the program branches to #36.

#36 P24

The trailing curtain switch 90 is sensitized. Unless charging is over, the program branches to #3. If charging is completed, then the program goes forward to a release control shown in FIG. 9 by way of E.

#37 P10←1

A high level is output to the port P10. Thus the transistor 82 is turned on to excite the first tension magnet 78. A first tension of the camera is released, and a mechanical release sequence which is not indicated is actuated.

#38 P11←1

The transistor 83 is turned on by outputting a high level to the port P11, and excites the aperture control magnet 79 to commence an aperture control.

#39 WAIT 10 ms

Waiting for 10 ms long enough to clear the first tension.

#40 P10←0

Stopping an excitation of the first tension magnet 78.

#41 ACC←Av−F1.4

A difference in level between the decided camera aperture Av and the open aperture F1.4 is obtained and loaded in the accumulator.

Loops #42 to #44 are routines for stopping-down control. The mechanical release sequence actuated at #37 drives a stopping-down mechanism, and the aperture is stopped down from open. Whenever the aperture is stopped down ⅛ stages according thereto, the aperture switch 88 is turned on/off once, generating one pulse.

42 ACC : 0

If the stage number to be stopped down is 0, the program branches to #45.

#43 P22 1 pulse

Waiting for generation of 1 pulse according to on/off operation of the aperture switch 88.

#44 ACC←ACC−1

Subtracting 1 from a value of the accumulator.

When pulses for the stopping-down stage number obtained at #41 are counted through the loops #42 to #44, the program goes forward to #45.

#45 P11←0

The stopping-down mechanism is stopped by stopping the excitation of the aperture control magnet 78. Thus, a camera aperture can be coordinated with the aperture Av.

#46 P27

Whether or not the stroboscope has been charged is discriminated. If not, then the program goes forward to #55. However, the charging is over currently, and hence the program goes forward to #47.

#47 Bv 28H

When Bv value is greater than APEX 5, the program goes forward to #49, but when it is less, the program goes forward to #48.

#48 (DAP)←Sv

A film photosensitivity is output to the D/A converter 53. The D/A converter 53 outputs a voltage shown in FIG. 16 to an emitter of the expanding transistor 67. For example, a voltage $Vc-(4\ kT/q)\ \ln 2$ is output at the time of ISO 100.

#54 P14←1, P15←1

A high level is output from the ports P14, P15. Thus a short circuit of the strobodimming integrating capacitor 70 is released, and an integration is commenced. Since a charge on the strobodimming integrating capacitor 70 is 0 at first, an output of the operational amplifier 71 is Vc, therefore an output of the dimming comparator 73 is kept low in level. Two inputs of the OR gate 74 become low in level both, therefore a voltage on the terminal S also becomes low in level, thus permitting a light emission of the stroboscope.

#55 P12←1

The leading curtain magnet 83 is excited, and the shutter leading curtain begins to run.

#56 WAIT

Waiting for a certain period of time.

#57 P12←0

The leading curtain magnet 83 is stopped from being excited. Whenever the shutter leading curtain has run, the X contact 108 gets on and the stroboscope emits the light.

The strobe light reflects on an object and is exposed to the film through a photographing lens. The quantity of light irradiated on the film is indicated by Lf. Then, a part of the light irradiated on the film reflects on the film surface and is incident on the silicon photodiode 64. The quantity of light in this case is indicated by Lspd. Lspd is then specified to be $2^{-4}$ times as much as the quantity of light on the film surface. If a photoelectric current of the silicon photodiode 64 be Ispd, an output voltage $V_{66}$ of the operational amplifier 66 will be expressed as:

$$V_{66} = Vc + \frac{kT}{q} \ln \frac{Ispd}{I_s}$$

A base-emitter voltage Vbe of the transistor is expressed by the following equation at the time of ISO 100:

$$\begin{aligned} Vbe &= Vc + \frac{kT}{q} \ln \frac{Ispd}{I_s} - \left( Vc - \frac{4kT}{q} \ln 2 \right) \\ &= \frac{kT}{q} \ln \frac{Ispd}{I_s} + \frac{kT}{q} \ln 2^4 \\ &= \frac{kT}{q} \ln \frac{2^4 \times Ispd}{I_s} \end{aligned}$$

accordingly, a collector current Ice of the expanding transistor 67 will be:

$$Ice = Is \cdot e^{(q/kT)Vbe} = 2^4 \cdot Ispd$$

That is, it is amplified $2^4$ times. Likewise, it becomes $2^0$ times at the time of ISO 6 and $2^8$ at the time of ISO 1600. When the collector current Ice is stored in the strobodimming integrating capacitor 70, an output voltage $V_{71}$ of the operational amplifier 71 will be:

$$V_{71} = \frac{1}{C} \int_o^t Ice\, dt + Vc$$

the output voltage $V_{71}$ rises from Vc according to a light emission of the stroboscope and when it equalizes to a voltage of the constant voltage source 72, an output of the dimming comparator 73 turns over to a high level from low, and raises a voltage on the terminal S to a high level. Thus, as mentioned above, the commutation circuit 4 (FIG. 2) stops the light emission of the stroboscope. If a film exposure by the stroboscope in this case be P, then:

$$P = \int_o^t Lf\, dt = 2^4 \int_o^t Lspd\, dt$$

Assuming that a conversion efficiency δ of the silicon photodiode 64 is 4 nA per lux:

$$\begin{aligned} P &= 2^4 \cdot \frac{1}{\delta} \int_o^t Ispd\, dt \\ &= \frac{1}{\delta} \int_o^t Ice\, dt \\ &= \frac{1}{\delta} \times C \Delta V \end{aligned}$$

If C=400 pF, ΔV=1.0V, then:

P=0.1 lux·sec

That is, the stroboscope can be stopped from emitting the light on a proper film exposure of ISO 100.

Then, a current amplification factor of the expanding transistor 67 changes by varying ISO, therefore a flash exposure appropriate to cope with ISO can be secured.

#58 TIMER←Tv

A shutter speed is substituted on the timer.

#59 TIMER Ready

Waiting for the timer to clock the shutter speed.

#60 P13←1

The trailing curtain magnet 81 is excited to start the shutter trailing curtain going.

#61 WAIT

Waiting for a certain period of time.

#62 P13←0

Excitation of the trailing curtain magnet 81 is stopped.

#63 P14←0, P15←0

A charge stored in the strobodimming integrating capacitor 70 is discharged. Further, with the voltage on the terminal S retained at high level, the stroboscope is prohibited from emitting the light. The program then returns to #3 of FIG. 7 by way of D.

As described above, the film can be exposed properly on the stroboscope when the extraneous light brightness Bv is APEX 5 or below.

When the extraneous light brightness Bv exceeds APEX 5 at #47, the situation is decided to apply to a daylight synchronous photographing, and the program branches to #49 accordingly. The daylight synchronous photographing uses the stroboscope as an auxiliary light when there is a big difference in luminance between the main object and the background, thereby exposing both appropriately.

However, an appropriate exposure of the background and the main object on the stroboscope is capable of providing an unnatural photograph like composite one. Consequently, the background is exposed appropriately, and the stroboscope is dimmed 1 to 2 stages under, thereby obtaining a natural daylight synchronized photograph.

49 Bv: 48H

The extraneous light brightness Bv is compared with APEX 9.

50 (DAP)←Sv+0CH

When Bv is 9 or over, a strobodimming 5 stages (OCH) under will be applied.

51 ACC←Bv−28H

52 ACC←(3×ACC)/8

53 (DAP)←Sv+ACC

Figures 12, 13:
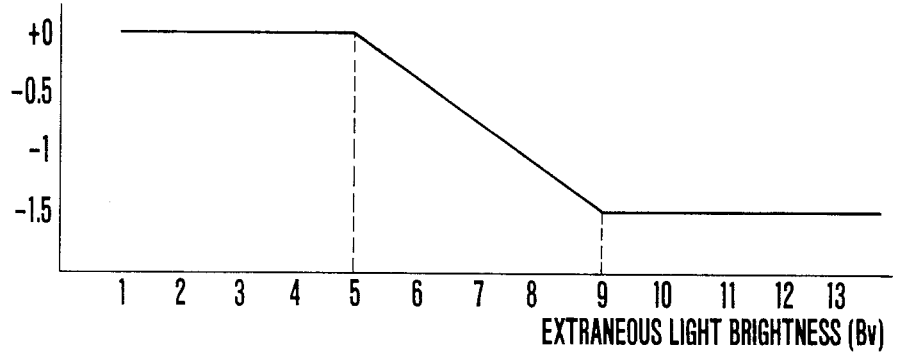
FIG. 12 is a drawing representing a strobodimming level characteristic.
FIG. 13 is a drawing indicating APEX values of distance, quantity of light and guide number.

In #51 to #53, the strobodimming is adjusted bit by bit under where Bv comes within APEX 5 to 9. For example, it is adjusted ⅜ stages under at Bv=6, and ¾ stages under at Bv=7. Dimming levels obtained through arithmetic operation at #48 to #53 are as shown in FIG. 12.

According to what has been described above, optimal shutter speed, aperture and dimming level can be decided from the extraneous light brightness and the main object distance in a stroboprogram mode.

"Stroboaperture Priority Mode; Stroboshutter Priority Mode"

Next, a description refers to an aperture priority mode wherein a photographer sets an aperture and a shutter priority mode wherein a shutter speed is set in the flash mode.

Loops #1 to #11 are similar to the stroboprogram mode, therefore a description will be omitted, and hence the description will be given to #12 and onward in FIG. 8.

12 P26

If the port P26 is low in level, then the mode is aperture priority or shutter priority, therefore the program goes forward to #64.

64 P25

Discriminating whether the first mode setting switch 91 is turned on or off. If off, then the mode is shutter priority, and hence the program branches to #71, but if on, the mode is aperture priority, and the program branches to #65.

65 Av←(ATP)

A hexadecimal number corresponding to the aperture set by a photographer is inputted from the set point input circuit 77.

66 Tv←Ev−Av

A shutter speed Tv is computed.

67 Tv: 1/250

The computed shutter speed is compared with 1/250 seconds.

68 Tv←1/250, P16←1

If the computed shutter speed is faster than the synchronous 1/250 sec., then the shutter speed is set at 1/250 sec., and the shutter speed display circuit 106 is operated to flicker for warning.

69 Tv: 1 sec.

The computed shutter speed is compared with 1 sec.

70 Tv←1 sec., P16←1

If the computed shutter speed is slower than the longest 1 sec., the shutter speed is set at 1 sec., and the shutter speed display circuit 106 is operated to flicker for warning. Thus, a shutter speed appropriate to the extraneous light is computed to the set aperture.

71 Tv←(ATP)

A hexadecimal number corresponding to the shutter speed set by a photographer is inputted from the set point input circuit 77.

72 Tv: 1/250

The set shutter speed is compared with 1/250 sec.

73 Tv←1/250

When a shutter speed faster than the synchronous 1/250 sec. is set, a slit exposure may result, therefore the shutter speed is set at 1/250 sec.

74 Av←Ev←Tv

The aperture Av appropriate to the extraneous light is obtained through arithmetic operation.

75 Av: F32

The computed aperture is compared with F32.

76 Av←F32, P17←1

If the computed aperture comes on the side stopped down from F32, the aperture is set at F32, and the aperture display circuit 107 is operated to flicker for warning.

77 Av: F1.4

The computed aperture is compared with F1.4.

78 Av←F1.4, P17←1

If the computed aperture comes on the side open from F1.4, the aperture is set at F1.4, and the aperture display circuit 107 is operated to flicker for warning.

79 AvEF: F1.0

If a distance information from the stroboscope is away from F1.0 in an aperture conversion, then the stroboscope is not capable of giving the light sufficient in quantity to a proper exposure, therefore the program branches to #80.

80 F16←1, P17←1

Both shutter speed display circuit 106 and aperture display circuit 107 are operated to flicker, thereby warning that the strobe light is not powerful enough to reach before photographing.

81 Bv: 30H

If Bv>6, the program branches to #83, and if Bv≦6, then it branches to #82.

82 AvEF+18H: Av

The situation that the minimum aperture AvEF computed at #11 is greater (coming on a stopped-down side) than the camera aperture Av to be controlled actually indicates that the stroboscope guide number is capable of giving enough quantity of light to the main object to dimming. Where the minimum aperture AvEF is less (coming on an open side), to the contrary, than the camera aperture Av, a proper quantity of light cannot be given even by the full emission of light of the stroboscope, of which a warning must be given.

However, a warning will not be given at #82 before the minimum aperture AvEF comes less than the camera aperture Av by 3 stages or over. Accordingly, at Bv≦6, a warning will be kept from going as long as an exposure value permissible to a certain degree as photograph even though it is somewhat under in consideration of an error to arise at the time of measurement.

83 AvEF+28H: Av

When Bv>6, the situation may apply to a daylight synchronous photographing, and the exposure will come somewhat under as described at #49 to #53, therefore the warning is given only when the minimum aperture AvEF is less than the camera aperture Av by 5 stages or over.

A similar operation follows thereafter to that of stroboprogram mode.

"AE Mode"

In case the stroboscope is not connected, or the main capacitor 2 (FIG. 2) of the stroboscope has not yet been charged, a control of AE mode will be carried out on the camera.

Loops #1 to #9 are similar to the flash mode. The analog switch 104 is turned on at #8, however, since the terminal C is kept open, an output of the operational amplifier 103 becomes Vc; and an output of the comparator 105 becomes low in level. Accordingly, the program branches to #84 at #9.

84 P26

A state of the second mode setting switch 92 is discriminated, and if it stands in the program mode, the program branches to #98.

85 P25

A state of the first mode setting switch 91 is discriminated. If it stands in the shutter priority mode, the program branches to #92, but if in the aperture priority mode, then the program branches to #86.

Loops #86 to #91 refer to an arithmetic operation in aperture priority, and operate, almost similarly to #65 to #70, the shutter speed appropriate to the extraneous light to the set aperture Av.

Those #92 to #97 refer to an arithmetic operation in shutter priority, and operates, almost similarly to #71 to #78, the aperture appropriate to the extraneous light to the set shutter speed.

Loops #98 to #107 refer to an arithmetic operation in AE program mode.

98 Av←Ev/2−OCH

The aperture Av is computed from Ev value.

99 Av: F32

The computed aperture is compared with F32.

100 Av←F32

When the computed aperture comes on the side stopped down from F32, the aperture is set at F32.

101 Av: F1.4

The computed aperture is compared with F1.4.

102 Av←F1.4

When the computed aperture comes on the side open from F1.4, the aperture is set at F1.4.

103 Tv←Ev−Av

The proper shutter speed Tv is computed according to the computed aperture value.

104 Tv: 1/4000

The computed shutter speed is compared with 1/4000 sec.

105 Tv←1/4000, P16←1, P17←1

If the computed shutter speed is faster than 1/4000 sec., then, with the shutter speed set at 1/4000 sec., the shutter speed display circuit 106 and the aperture display circuit 107 are operated to flicker for warning.

106 Tv: 1 sec.

The computed shutter speed is compared with 1 sec.

107 Tv←1 sec., P16←1, P17←1

If the computed shutter speed is slower than 1 sec., the shutter speed is set at 1 sec., and the shutter speed display circuit 106 and the aperture display circuit 107 are operated to flicker for warning. Thus, shutter speeds and apertures of the program at the time of AE mode, the shutter priority and the aperture priority are computed. These values are as shown in the program line AE of FIG. 10.

Then, while the first stroke switch 86 is kept on, a photometry through #3 to #9, an arithmetic operation through #84 to #107 and a display routine through #34 to #36 are executed repeatedly in order as in the case of flash mode.

Figure 9:
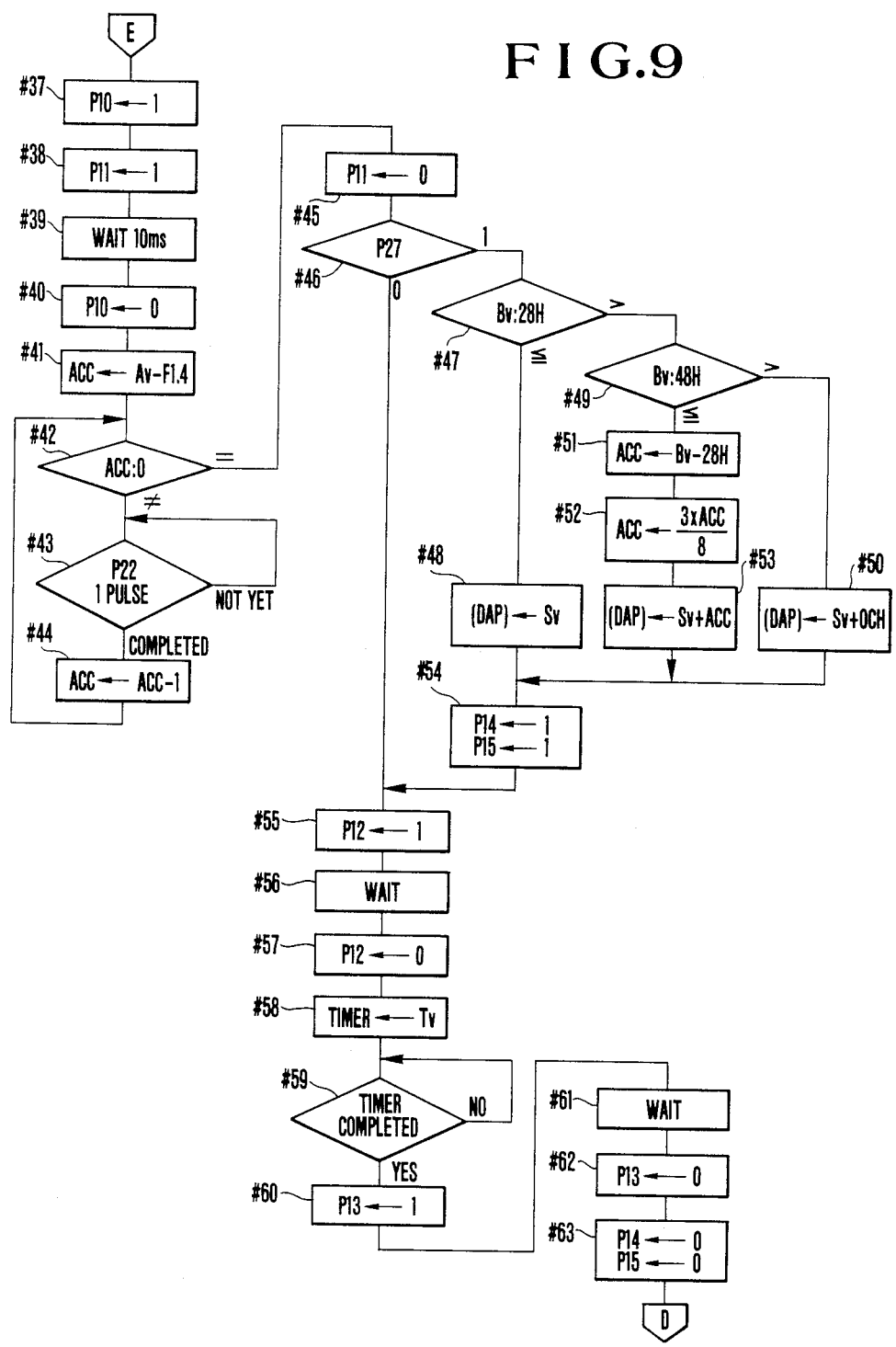

Further, when the second stroke switch 87 is turned on, the program goes forward to a release control routine of FIG. 9, thus controlling automatic diaphragm and shutter.

Then, in the illustrative example, the distance information is obtained from the stroboscope, however, it can be obtained otherwise from a distance detector of the camera or from a distance ring.

As described above, according to the invention, in case the minimum aperture ready for strobodimming which is obtained from a distance to the object, a stroboscope guide number and a film photosensitivity come below a predetermined value, a camera diaphragm is adjusted to the minimum aperture, but where the minimum aperture exceeds the predetermined value, the camera diaphragm is controlled to an aperture opened further than the minimum aperture, thus enhancing a continuous light emitting performance of the stroboscope.

According to the invention, furthermore, in case the minimum aperture ready for strobodimming which is computed from a distance to the object, a stroboscope guide number and a film photosensitivity is opened further by a constant stage number or greater than the aperture set by a photographer or the aperture computed from a brightness of the extraneous light, a warning is given that the situation is not to cope with a flash photographing, but where it does not come on the side open by a constant stage number or over, the camera diaphragm is controlled to the aperture set by a photographer or the aperture computed from a brightness of the extraneous light, therefore the photographer's intention can be esteemed so much, and a daylight synchronous photographing can be facilitated.

What is claimed is:

1. An aperture decision system for flash photographing on the light reflected from an object which is preemitted by flash means, comprising:
   (a) means for detecting an aperture value based on said reflected light and generating an output signal indicative of such aperture value;
   (b) computing means for
      (1) receiving said detecting means output signal,
      (2) receiving input as to a predetermined aperture value and generating a signal indicative thereof,
      (3) comparing said detecting means output signal and said signal indicative of said predetermined aperture value and generating a comparison output signal, and
      (4) deciding an aperture value shifted to the open side of said aperture value indicated in said detecting means output signal to be a flash aperture value when said comparison output signal indicates that said aperture value indicated in said detecting means output signal is an aperture value on the side stopped down from said predetermined aperture value.

2. The aperture decision system according to claim 1, wherein said computing means decides a further aperture value to be the flash aperture value when said comparison output signal indicates that said aperture value indicated in said detecting means output signal is an aperture value on the open side of said predetermined aperture value within a predetermined range thereof.

3. The aperture decision system according to claim 1, wherein the aperture value based on said reflected light is a minimum aperture value determined on a stroboscope guide number.

4. A decision system for flash aperture based on an object distance, comprising:
   (a) means for detecting an aperture value based on said object distance and generating an output signal indicative of such aperture value;
   (b) computing means for
      (1) receiving said detecting means output signal,
      (2) receiving input as to a predetermined aperture value and generating a signal indicative thereof,
      (3) comparing said detecting means output signal and said signal indicative of said predetermined aperture value and generating a comparison output signal, and
      (4) deciding an aperture value shifted to the open side of said aperture value indicated in said detecting means output signal to be a flash aperture value when said comparison output signal indicates that said aperture value indicated in said detecting means output signal is an aperture value on the side stopped down for said predetermined aperture value.

5. The decision system for flash aperture based on an object distance according to claim 4, wherein said computing means decides a further aperture value to be the flash aperture value when said comparison output signal indicates that said aperture value indicated in said detecting means output signal is an aperture value on the open side of said predetermined aperture value within a predetermined range thereof.

6. A flash photographing system having an aperture decision device, comprising:
   (a) first aperture signal forming means for obtaining an aperture value based on an output of a photometric circuit for measuring the extraneous light and generating an output signal indicative thereof;
   (b) second aperture signal forming means for obtaining an aperture value based on object distance information and generating an output signal indicative thereof;
   (c) computing means for
      (1) receiving said output signals of said first and second aperture signal forming means,
      (2) comparing said output signals of said first and second aperture signal forming means and generating a comparison output signal, and
      (3) deciding the flash aperture value according to the aperture value indicated in the second aperture signal forming means output signal when said comparison output signal indicates that the aperture value indicated in the first aperture signal forming means output signal is on an open side of the aperture value indicated in the second aperture signal forming means output signal, and
      (4) deciding the flash aperture value according to the aperture value indicated in the first aperture signal forming means output signal when said comparison output signal indicates that the aperture value indicated in the first aperture signal forming means output signal is on the stopped-down side of the aperture value indicated in the second aperture signal forming means output signal.

7. The flash photographing system according to claim 6, wherein said second aperture signal forming means obtains such aperture value indicated in said output signal thereof in accordance with inputs thereto respecting a stroboscope guide number and object distance information.

8. The flash photographing system according to claim 6, wherein said second aperture signal forming means obtains said object distance information through detecting the light reflected from the object which is preemitted from a flash means, thereby obtaining the aperture value based on the information.

9. A flash photographing system having an aperture decision device, comprising:
   (a) first aperture signal forming means for obtaining an aperture value, based on an output of a photometric circuit for measuring the extraneous light and generating an output signal indicative thereof;
   (b) second aperture signal forming means for obtaining an aperture value based on object distance information and generating an output signal indicative thereof; and
   (c) computing means for
      (1) receiving said output signals of said first and second aperture signal forming means,
      (2) comparing said output signals of said first and second aperture signal forming means and generating a comparison output signal, and
      (3) deciding the flash aperture value according to the aperture value indicated in the first aperture signal forming means output signal when said comparison output signal indicates that the aperture value indicated in the first aperture signal forming means output signal is on the stopped-down side within a predetermined stage number of the aperture value indicated in the second aperture signal forming means output signal, and also when said comparison output signal indicates that the aperture value indicated in the second aperture signal forming means output signal is on the stopped-down side of the aperture value indicated in the first aperture signal forming means output signal.

10. The flash photographing system according to claim 9, wherein said second aperture signal forming means obtains said object distance information through detecting a light reflected from the object which is preemitted from a flash means, thereby obtaining the aperture value based on the information.

11. The flash photographing system according to claim 9, wherein said computing means decides said predetermined stage number based on said output of the photometric circuit according to a luminance value of the extraneous light.

12. The flash photographing system according to claim 11, wherein said computing means sets a said predetermined stage number when the luminance value of the extraneous light is higher than a predetermined luminance value, said computing means further setting the flash aperture value to be larger than said predetermined stage number when the luminance value of the extraneous light is lower than the predetermined luminance value.

13. A flash photographing system having an aperture decision device, comprising:
(a) aperture setting means for setting an aperture value manually and generating an output signal indicative thereof;
(b) aperture signal forming means for obtaining an aperture value based on object distance information and generating an output signal indicative thereof;
(c) computing means for
   (1) receiving said output signals of said aperture setting means and aperture signal forming means,
   (2) comparing said output signals of said aperture setting means and aperture signal forming means and generating a comparison output signal, and
   (3) deciding the flash aperture value according to the aperture value indicated in the aperture setting means output signal when said comparison output signal indicates that the aperture value indicated in the aperture setting means outputs signal is on the stopped-down side within a predetermined stage number of the aperture value indicated in the aperture signal forming means output signal, and also when said comparison output signal indicates that the aperture value indicated in the aperture signal forming means output signal is on the stopped-down side of the aperture value indicated in the aperture setting means output signal.

14. The flash photographing system according to claim 13, wherein said aperture signal forming means obtains said object distance information through detecting the light reflected from the object which is preemitted form a flash means, thereby obtaining the aperture value based on the information.

* * * * *